US012434398B2

(12) United States Patent
Antonakis

(10) Patent No.: US 12,434,398 B2
(45) Date of Patent: Oct. 7, 2025

(54) SHAVER HEAD

(71) Applicant: BIC Violex Single Member S.A., Anoixi (GR)

(72) Inventor: Ion-Ioannis Antonakis, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 178 days.

(21) Appl. No.: 18/493,338

(22) Filed: Oct. 24, 2023

(65) Prior Publication Data

US 2024/0131736 A1 Apr. 25, 2024
US 2024/0227223 A9 Jul. 11, 2024

(30) Foreign Application Priority Data

Oct. 25, 2022 (EP) .................................... 22203439

(51) Int. Cl.
*B26B 21/14* (2006.01)
*B26B 21/40* (2006.01)
*B26B 21/52* (2006.01)

(52) U.S. Cl.
CPC .......... *B26B 21/14* (2013.01); *B26B 21/4056* (2013.01); *B26B 21/526* (2013.01)

(58) Field of Classification Search
CPC .... B26B 21/14; B26B 21/4056; B26B 21/526
See application file for complete search history.

(56) References Cited

U.S. PATENT DOCUMENTS

| | | | |
|---|---|---|---|
| 3,316,633 A | 5/1967 | Tapper | |
| 3,373,747 A | 3/1968 | Tapper | |
| 6,014,918 A | 1/2000 | Orloff | |
| 8,838,232 B1 | 9/2014 | Schwerin | |
| 9,084,891 B2 | 7/2015 | Aberizk | |
| 2013/0199348 A1 | 8/2013 | Aberizk | |
| 2013/0345684 A1 | 12/2013 | Eckhouse et al. | |
| 2014/0087639 A1* | 3/2014 | Worthington | B26B 21/50 451/367 |
| 2024/0051165 A1* | 2/2024 | Chrysanthakopoulos | B26B 21/4056 |

FOREIGN PATENT DOCUMENTS

| | | |
|---|---|---|
| DE | 1553831 A1 | 5/1971 |
| DE | 102008032389 A1 | 1/2010 |
| FR | 1515541 A | 3/1968 |
| GB | 1120349 A | 7/1968 |
| WO | 2013140309 A1 | 9/2013 |

OTHER PUBLICATIONS

Search Report issued in European Application No. 22203439.9, mailed on Apr. 24, 2023.

* cited by examiner

*Primary Examiner* — Omar Flores Sanchez
(74) *Attorney, Agent, or Firm* — Bookoff McAndrews, PLLC

(57) ABSTRACT

A shaver head comprising a blade assembly having one or more blades for cutting hair in a shaving direction; a skin adaptor extending from an outer periphery of said blade assembly and having a skin adaptor surface configured to be in contact with a shaving surface; a coil assembly, the coil assembly being configured to be transitioned between an active state and an inactive state and to generate an electromagnetic field in the active state. The electromagnetic field can be configured to cause pili muscles in the shaving surface to contract in order to expose hair of the shaving surface so that the hair is cut by the blades of the blade assembly.

15 Claims, 3 Drawing Sheets

SHAVER HEAD

CROSS-REFERENCE TO RELATED APPLICATION

This application claims benefit from European patent application EP22203439.9, filed Oct. 25, 2022, its content being incorporated herein by reference.

TECHNICAL FIELD

The present disclosure relates to the field of skincare, and in particular shaving. More specifically, the present disclosure relates to a shaver head for exposing hair of a user during shaving. Further, the present disclosure relates to a shaving device comprising such shaver head and to a method of cutting hair of a shaving surface.

TECHNOLOGICAL BACKGROUND

Generally, when a user is performing a shaving action with a multi-blade shaver, a first blade pulls the hair while the other blades perform the cutting action.

In some shaving areas, the hair can grow substantially parallel to the skin, for example under the chin area. When shaving, such hair can be cut at an angle which is not perpendicular to the surface of the skin. Therefore, after shaving, a sharp tip can appear at the top of the hair which can penetrate the skin and lead to ingrown hair.

SUMMARY

In this context, it is desirable to provide shaving devices that reduce the proportion of ingrown hair after shaving.

According to aspects of the disclosure, a shaver head is provided. The shaver head comprises a blade assembly having one or more blades for cutting hair in a shaving direction; a skin adaptor extending from an outer periphery of said blade assembly and having a skin adaptor surface configured to be in contact with a shaving surface; a coil assembly configured to be transitioned between an active state and an inactive state and to generate an electromagnetic field in the active state; such electromagnetic field being configured to cause pili muscles in the shaving surface to contract in order to expose hair of the shaving surface so that the hair is cut by the blades of the blade assembly.

In the present description, the arrector pili muscles (or "pili muscles"), also known as hair erector muscles, are small muscles attached to hair follicles in mammals. Contraction of these muscles causes the hair to stand on end, which is known colloquially as goose bumps (piloerection).

In the present description, an electromagnetic coil (or "coil") refers to an electric circuit, comprising one or more turns of wire configured to carry current. Such coil can have various shapes, for example a substantially circular or cylindrical shape.

In the present description, an electromagnetic field is a classical (i.e. non-quantum) field produced by accelerating electric charges. Such electromagnetic field can be described by classical electrodynamics and is the classical counterpart to the quantized electromagnetic field tensor in quantum electrodynamics.

In the manner described and according to aspects illustrated herein, the shaver head improves the shaving experience of the user via the use of electromagnetic fields.

During shaving, the shaver head excites the pili muscles of the shaving surface through electrostimulation with electromagnetic fields and thereby prepare the hair for shaving.

The coil assembly disposed below the skin adaptor surface of the skin adaptor emits electromagnetic fields that travel through the topmost surface of the skin causing the pili muscles to contract. The resulting movement of the hair follicle exposes the hair, reducing distances between the blade assembly and the hair and reducing the likelihood of ingrown hair caused by shaving.

Due to the contraction of the pili muscles in the shaving surface caused by the electromagnetic field, the hair is exposed, i.e., the hair is moved to a position substantially perpendicular to the skin of the shaving surface. Therefore, the hair can be easily cut by the blade assembly with a reduced attack angle. As the cutting of the hair is substantially parallel to the skin of the shaving surface, the blade assembly and the skin are closer during shaving and ingrown hair and skin irritation is reduced.

According to aspects of the disclosure, the skin adaptor may comprise a non-conductive material configured to electrically insulate the shaving surface from the coil assembly. Such electrical insulation of the shaving surface from the coil assembly makes the stimulation of pili muscles with the shaver head according to the present disclosure safe and therefore particularly advantageous compared to Electrical Muscle Simulation using conductive pads.

According to aspects of the disclosure, the coil assembly may comprise one or more coils, wherein the one or more coils are proximal to a first blade of the blade assembly in the shaving direction.

According to aspects of the disclosure, the coil assembly may extend at least over 100% of a length of the blades in a direction substantially perpendicular to the shaving direction.

According to aspects of the disclosure, the coil assembly may comprise one or more coils disposed at a distance less than or equal to 5 mm from the skin adaptor surface.

According to aspects of the disclosure, the electromagnetic field generated by the coil assembly may comprise a frequency within a range of 5 to 500 Hz, more specifically of 10 to 60 Hz and in more specific examples, 10 or 30 or 50 Hz.

According to aspects of the disclosure, a shaving device is provided. The shaving device may comprise a shaver head according to any aspects disclosed herein; and a handle configured to support the shaving head.

According to aspects of the disclosure, the handle may comprise a driver unit configured to provide an electrical signal for driving the coil assembly so that the coil assembly emits the electromagnetic field.

According to aspects of the disclosure, the shaving device may comprise an actuator configured to allow a user to adjust a frequency of the electromagnetic field or an intensity of the electromagnetic field.

According to aspects of the disclosure, the shaving device may comprise a skin sensor that is disposed on the skin adaptor surface between the shaving surface and the coil assembly and configured to transition the coil assembly from the inactive state to the active state when the skin adaptor surface is in contact with the shaving surface.

According to aspects of the disclosure, the shaving device may comprise a hand sensor configured to transition the coil assembly from the active state to the inactive state, for example when the shaving device is not held by a user.

According to aspects of the disclosure, the skin sensor and/or the hand sensor may comprise one or more of: a capacitive sensor, a proximity sensor, an ultrasonic proximity sensor, and a time-of-flight sensor.

According to aspects of the disclosure, the shaving device may comprise a communication unit configured to establish a wireless connection between the shaving device and a remote device.

According to aspects of the disclosure, the communication unit may be further configured to receive instructions from the remote device in order to change a frequency of the electromagnetic field or an intensity of the electromagnetic field.

According to aspects of the disclosure, a method of cutting hair of a shaving surface is provided. The method comprises the steps of providing a shaving device according to any aspects disclosed herein; pressing the skin adaptor surface in contact with the shaving surface; transitioning the coil assembly from the inactive state to the active state so as to cause pili muscles in the shaving surface to contract in order to expose hair of the shaving surface.

According to aspects of the disclosure, the method may comprise moving the shaver head along the shaving surface with exposed hair in the shaving direction so that the one or more blades cut the exposed hair.

BRIEF DESCRIPTION OF THE DRAWINGS

The disclosure thereof will be better understood upon reading the detailed description which follows, of embodiments given as non-limiting examples. This description refers to the appended drawings, wherein.

DETAILED DESCRIPTION OF EMBODIMENTS

Figure 1:
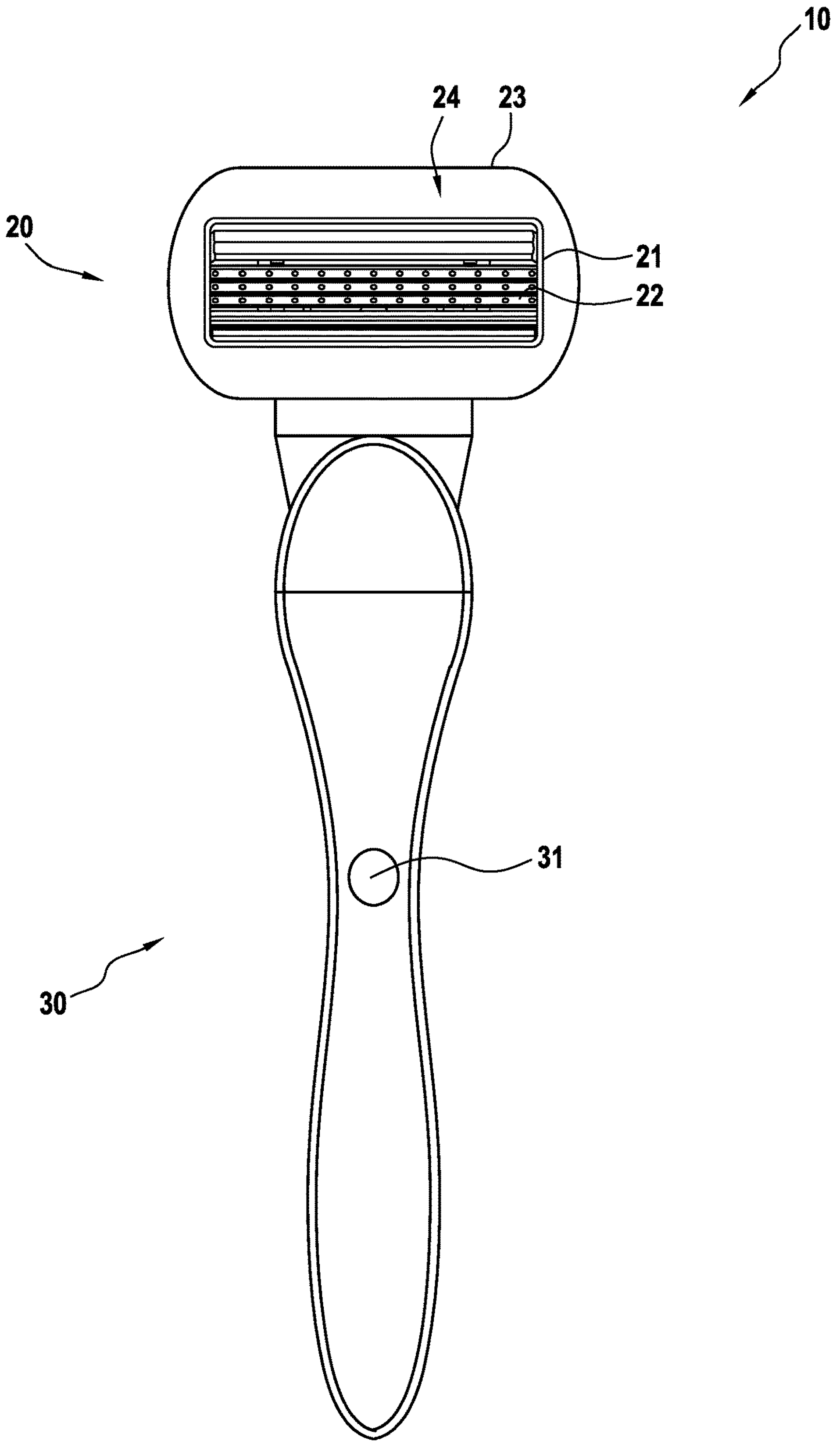
FIG. 1 is a front view of a shaving device comprising a shaver head according to aspects of the present disclosure.

Embodiments of a shaving device for exposing hair of a shaving surface and embodiments of a shaver head for a shaving device according to aspects of the disclosure will be described with reference to FIGS. 1-3, wherein like numerals represent like parts.

Although the shaving device and the shaver head are described with reference to specific examples, it should be understood that modifications and changes may be made to these examples without going beyond the general scope as defined by the claims. In particular, individual characteristics of the various embodiments shown and/or mentioned herein may be combined in additional embodiments. Consequently, the description and the drawings should be considered in a sense that is illustrative rather than restrictive. The Figures, which are not necessarily to scale, depict illustrative aspects and are not intended to limit the scope of the disclosure. The illustrative aspects depicted are intended only as exemplary.

The term "exemplary" is used in the sense of "example," rather than "ideal." While aspects of the disclosure are amenable to various modifications and alternative forms, specifics thereof have been shown by way of example in the drawings and will be described in detail. It should be understood, however, that the intention is not to limit aspects of the disclosure to the particular embodiment(s) described. On the contrary, the intention of this disclosure is to cover all modifications, equivalents, and alternatives falling within the scope of the disclosure.

As used in this disclosure and the appended claims, the singular forms "a," "an," and "the" include plural referents unless the content clearly dictates otherwise. As used in this disclosure and the appended claims, the term "or" is generally employed in its sense including "and/or" unless the content clearly dictates otherwise.

Throughout the description, including the claims, the terms "comprising a," "including a," and "having a" should be understood as being synonymous with "comprising one or more," "including one or more," and "having one or more" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially," "approximately," and "generally" should be understood to mean falling within such accepted tolerances.

The shaving device 10 comprises a shaver head 20 and a handle 30. It is contemplated that the shaver head 20 of the shaving device 10 is configured to shave a shaving surface 50 of a body part (e.g. a face, arm, leg, and/or the like) of a user in a shaving direction. Accordingly, referring to FIGS. 3A-3B, the shaver head 20 is configured to face a shaving surface 50 comprising hair 51 to be cut, the shaving direction being indicated by the left pointing arrows.

Additionally, the shaver head 20 comprises a blade assembly 21 having one or more blades 22. Each blade 22 of the blade assembly 21 may have a sharp edge configured to cut the hair 51 of the shaving surface 50 when the shaver head 20 is glided over the shaving surface 50 in the shaving direction. The shaving direction is a direction determined by the orientation of the blades, the sharp edge thereof pointing toward the shaving direction. The first blade 22 of the blade assembly 21 refers to the blade that is the first to glide over the shaving surface 50 when the shaving device 10 is caused to perform a shaving action.

In embodiments, the one or more blades 22 may be mounted on an upper surface of a blade support. The upper surface being understood as a flat portion of the blade support which faces the shaving surface 50 when in use, the one or more blades 22 being thereof disposed between the blade support and the shaving surface 50.

In embodiments, the one or more blades 22 may be attached to a lower surface of a flat portion of a blade support. The lower surface being understood as a portion of the blade support opposite to a portion of the blade support which faces the shaving surface 50 when in use. The blade support is thereof disposed between the shaving surface and portions of the one or more blades 22 by which the one or more blades 22 are attached to the blade support.

In yet other embodiments, the one or more blades 22 may be an integrally formed cutting member comprising a base portion, a curvilinear portion, and a cutting-edge portion. Such blade embodiments are generally referred to as bent blades.

In examples, the blade assembly 21 may comprise spring fingers, a guard bar, a lubrication strip and a frame configured to integrate all these elements together with the blade(s) in the shaver head 20.

It is contemplated that the handle 30 of the shaving device 10 is configured to be held by a hand of the user. Accordingly, the handle 30 of the shaving device 10 may include an elongated, ergonomic shape corresponding to the hand of the user. Further, it is contemplated that the shaver head 20 may be configured to be supported by and/or coupled to the handle 30 by way of a known coupling mechanism (not shown) included on and/or forming part of one or more of the head 20 and/or the handle 30 of the shaving device 10.

The shaver head 20 is configured to expose hair 51 of the shaving surface 50 when performing a shaving action. To this end, referring to FIGS. 2A-2B, the shaver head 20 comprises a coil assembly 25 which generates an electromagnetic field configured to contract the pili muscles in the shaving surface 50 when the shaver head 20 is in contact with the shaving surface 50.

Figure 2A:
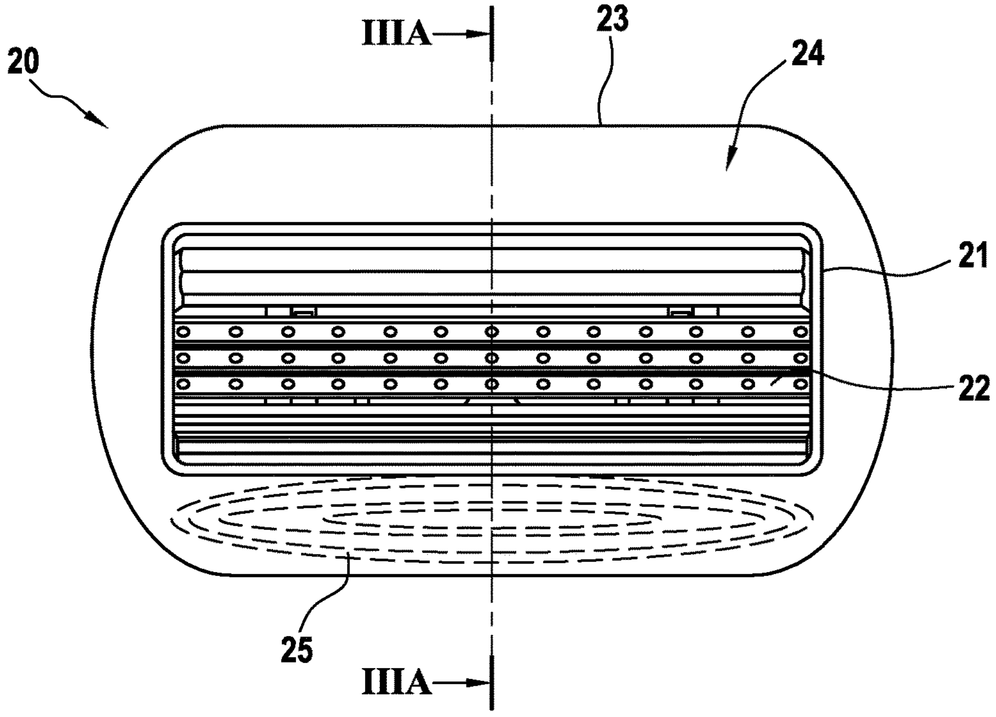
FIG. 2A is a detailed view of a shaver head showing a first example of a coil assembly according to aspects of the present disclosure.
Figure 2B:
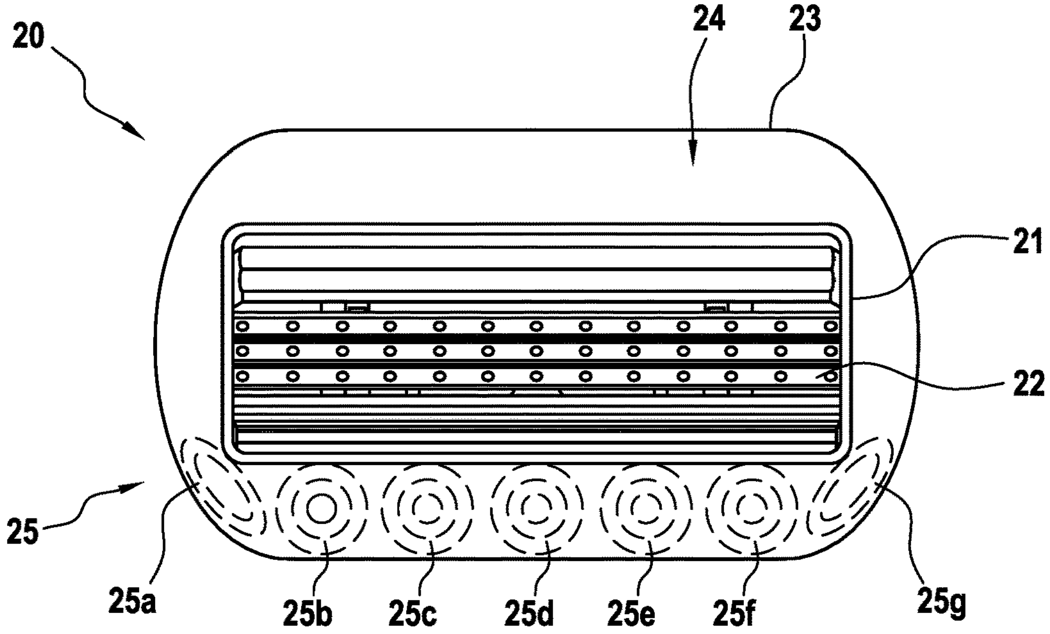
FIG. 2B is a detailed view of a shaver head showing a second example of a coil assembly according to aspects of the present disclosure.

As shown in FIGS. 2A-2B, the skin adaptor 23 extends from the outer periphery of the blade assembly 21, and comprises an outer surface referred to as skin adaptor surface 24 which is configured to be in contact with the shaving surface 50. In embodiments, the skin adaptor 23 is configured to electrically insulate the shaving surface 50 from the coil assembly 25. To this end, the skin adaptor 23, in particular the skin adaptor surface 24, comprises at least a layer of non-conductive material. For example, a polymer that has a very low conductivity and a high dielectric strength may be used, such as Acrylonitrile butadiene styrene (ABS), Polyethylene terephthalate glycol (PETG), or Nylon.

As shown in FIGS. 2A-2B, the coil assembly 25 may comprise one or more electromagnetic coils **25*a*-25*f* that generate electromagnetic fields for contracting pili muscles in the shaving surface 50**.

In embodiments, the coil assembly 25 is disposed within the shaver head 20 so as to be set back from the skin adaptor 23 relative to the skin adaptor surface 24 that is configured to be in contact with the shaving surface 50. Therefore, when gliding the shaver head 20 over the shaving surface 50 in the shaving direction, the coil assembly 25 exposes hair 51 of an area of the shaving surface 50 before the first blade 22 comes into contact with such exposed hair 51 to be cut.

It is contemplated that the coil assembly 25 delivers enough electromagnetic energy to the shaving surface 50 in order to cause contraction of the pili muscles. To this end, the coil assembly 25 is disposed as close as possible to the shaving surface 50 behind the skin adaptor surface 24, for example, proximal to a first blade 22 of the blade assembly 21.

In particular, the coil needs to be in front of the first blade 22 at a distance that would be substantial enough to allow enough time for an electromagnetic field to stimulate the pili muscle, such that, at the point in time where the first blade 22 contacts the hair, the piloerection is at its highest level (i.e. that pili muscles are nearly 100% contracted).

In embodiments, the coil assembly 25 is disposed at a distance inferior to 5 mm from the skin adaptor surface 24. Further, the size and the shape of the coils in the coil assembly 25 may be adapted to extend over a length of the blades of the blade assembly 21. Other parameters of the coil assembly 25 such as the number of coils, the area of the coils, the number of turns of the coils, the thickness of the coil wiring and, hence, the inductance of the coils, may also be adapted depending upon the type of shaving surface 50. For example, a shaving surface 50 that belongs to a male body will generally require a higher amount of electromagnetic energy than a similar shaving surface 50 belonging to a female body.

In embodiments, as schematically depicted in FIGS. 2A-2B, the coils may be thin and flat. Any coils used for emitting electromagnetic fields that is known in the art can be used in the shaver head according to the present disclosure.

In embodiments, the coil assembly 25 may comprise a material such as (but not limited to) Copper, Aluminum, Graphene, or a conductive polymer.

In embodiments, the electromagnetic field emitted by the coil assembly 25 can have a frequency in a range from 5 Hz to 500 Hz, more specifically, between 5 and 60 Hz. The frequency may, for example, be adjusted between 10 and 100 Hz, in steps of 10 Hz.

In embodiments, the electromagnetic field emitted by the coil can have an intensity between 0 and 100 V/m, more specifically 20 and 60 V/m (volts per meter).

In order to enable the coil assembly 25 to emit electromagnetic field(s), the coil assembly 25 may be driven by a driver unit (not shown in the Figures) emitting an electrical signal. The electrical signal, for example a time-varying analog electrical signal, can have various voltage and current ranges, depending, in particular, on the characteristics of the coil assembly 25 such as the area and the number of turns of the coils of the coil assembly 25. As an example, the electrical signal may have a voltage range between 0 and 3000 V.

In embodiments, the driver unit may be integrated in the shaver head 20, for example within the skin adaptor 23. In examples, the driver unit may be accommodated in the handle 30 of the shaving device 10. The shaving device 10 may comprise signal transmission elements that allow the electrical signal emitted from the driver unit to travel to the coil assembly 25. Further, the coupling mechanism that couples the shaver head 20 to the handle 30 may comprise electrical connection areas that connect signal transmission elements of the handle 30 to signal transmission elements of the shaver head 20.

In embodiments, the signal transmission elements may be conductive wires made of a conductive material such as (but not limited to) Copper and/or Aluminum. Further, the signal transmission elements may also be conductive polymers configured to act as conductive wires. In embodiments of the shaving device 10, the shaver head 20 may comprise conductive polymers strands that are separated by insulating strands integrated during an injection mold process.

In embodiments, the driver unit may receive a digital signal from a control unit (not shown in the Figures) that is internal or external to the shaving device 10. Such driver unit converts the digital signal of the control unit to the time-varying analog electrical signal configured to drive the coil assembly 25.

In embodiments, the shaving device 10 may include a power source (not shown in the Figures) configured to deliver power to the driver unit such that the driver unit is capable of delivering the electrical signal to the coil assembly 25. Further, the power source may be configured to deliver power to the control unit. It is contemplated that the shaving device 10 may include any source of power that may be compatible with the shaving device 10, such as disposable batteries, rechargeable batteries, a wireless inductive charging module, and/or the like.

It is contemplated that the shaving device 10 can detect in real time if a user is using the shaving device 10 and, in the affirmative, activate the emission of an electromagnetic field to expose hair. To this end, the shaving device 10 may comprise a hand sensor included in the handle that detects if the shaving device 10 is being held used by a user or if it is resting on a surface. Based on such information, the hand sensor may be configured to transition the coil assembly 25 accordingly between the active state and the inactive state.

In embodiments, the hand sensor may be configured to transition the coil assembly from the active state to the inactive state when the shaving device 10 is not held by a user (the shaving device 10 thereby entering a sleep mode). Additionally or alternatively, the hand sensor may be configured to transition the coil assembly from the inactive state to the active state when the shaving device is held by a user.

Further, the shaving device 10 may comprise a skin sensor 26 that detects if the shaver head 20 is in contact with the shaving surface 50. Based on such information, the skin sensor 26 may be configured to transition the coil assembly 25 between the active state and the inactive state. In embodiments, the skin sensor 26 is disposed in a part of the shaver head 20 that comes in contact with the shaving surface 50 when shaving, for example on the skin adaptor 23.

In embodiments, the transition of the coil assembly 25 from the inactive state to the active state may be operated if the skin sensor 26 detects that the shaver head 20 is in contact with the shaving surface 50 while the hand sensor detects that the shaving device 10 is being held by a user.

In embodiments, the hand sensor and the skin sensor 26 may be each in the form of, but not limited to, a capacitive sensor, a proximity sensor, an ultrasonic proximity sensor, and a time-of-flight sensor.

In embodiments, the active state and/or the inactive state of the coil assembly 25 may be displayed by a display element borne by the shaver head 20 or the handle 30. The display element may comprise a light assembly of a single color or multiple colors. The light assembly may comprise, for example, at least one LED light.

In embodiments, the shaving device 10 may include an actuator 31 configured to allow a user to adjust the frequency of the electromagnetic field or the intensity of the electromagnetic field. The actuator 31 may be in the form of, but not limited to, a button, a rotational encoder wheel, or a linear slider. The actuator 31 may be located in the handle 30.

In embodiments, the shaving device 10 may comprise a communication unit configured to establish a wireless connection between the shaving device 10 and a remote device. Based on instructions received from the remote device (instruction signal), the communication unit may allow the user to adjust parameters such as the frequency of the electromagnetic field or the intensity of the electromagnetic field, similarly to the adjustments allowed by the actuator 31 already mentioned. The communication unit may use a communication protocol such as Bluetooth, or Wireless Fidelity (WiFi) protocols.

According to embodiments, the shaving device 10 may comprise a processing unit that can run an operating system which manages the hardware of the shaving device and the software resources and provides services for application-specific algorithms which control the control unit and the coil assembly 25 in accordance with the information detected by the hand sensor and/or the skin sensor 26.

Additionally, the software may allow the user to change the intensity or frequency of the electromagnetic field, for example through an interaction with the actuator 31.

Figure 3A:
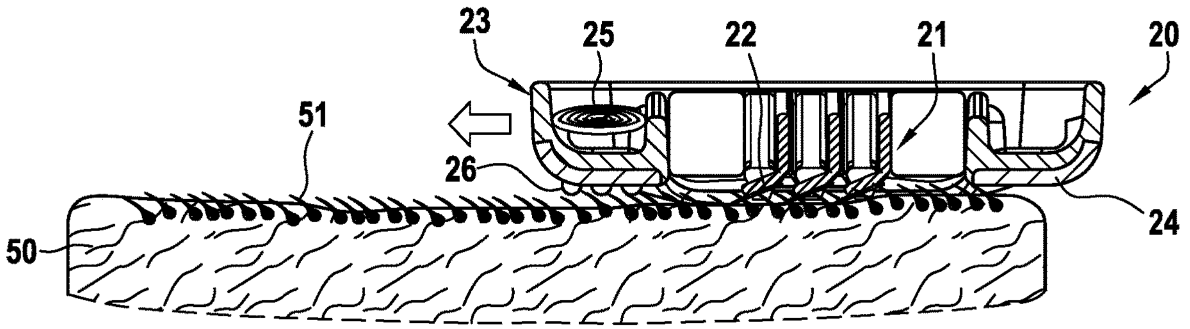
FIGS. 3A-3B are schematic views of a shaving head performing a shaving action according to aspects of the present disclosure.

As shown in FIG. 3A, the shaver head 20 may be moved by a user towards a shaving surface 50 comprising hair 51, as long as the skin adaptor surface 24 is out of contact of the shaving surface 50, the coil assembly 25 remains in an inactive state and the hair 51 remains substantially parallel to the plane of the shaving surface 50.

Figure 3B:
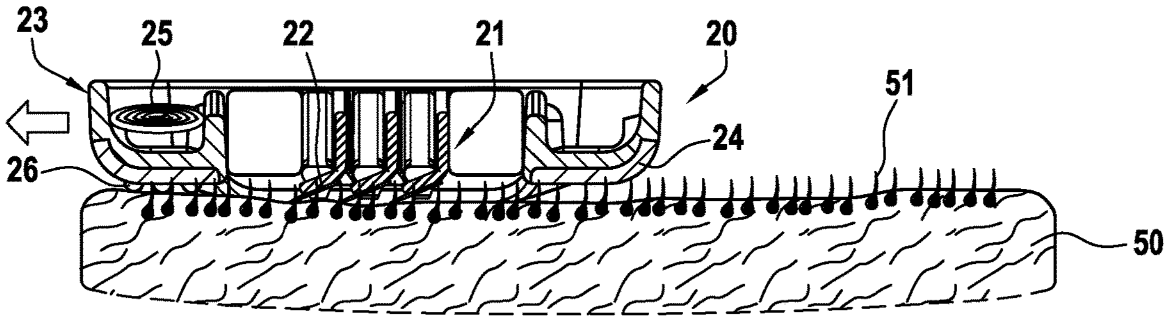

As shown in FIG. 3B, when the skin sensor 26 located on the skin adaptor surface 24 is put in contact with the shaving surface 50 and the shaver head 20 is glided over the shaving surface 50, the coil assembly 25 is transitioned to an active state and generates an electromagnetic field that travels from the shaver head 20 through the shaving surface 50 causing contraction of the pili muscles. Thus, the hair 51 is caused to move to a position substantially perpendicular to the plane of the shaving surface 50 and exposed upward from the shaving surface 50. Subsequently, the exposed hair 51 can be cut by the following set of blades 22, improving the overall shaving performance. In examples, the user can adjust the intensity of the electromagnetic field using, for example, an interface such as an actuator 31.

Although the present disclosure refers to specific exemplary embodiments, modifications may be provided to these examples without departing from the general scope of the disclosure as defined by the following claims. In particular, individual characteristics of the different illustrated/mentioned embodiments may be combined in additional embodiments. Therefore, the description and the drawings should be considered in an illustrative rather than in a restrictive sense.

The invention claimed is:

1. A shaver head comprising:

a blade assembly having one or more blades for cutting hair in a shaving direction;

a skin adaptor extending from an outer periphery of the blade assembly and having a skin adaptor surface configured to be in contact with a shaving surface;

a coil assembly configured to be transitioned between an active state and an inactive state and to generate an electromagnetic field in the active state; such electromagnetic field being configured to cause pili muscles in the shaving surface to contract in order to expose hair of the shaving surface so that the hair is cut by the blades of the blade assembly.

2. The shaver head of claim 1, wherein the skin adaptor comprises a non-conductive material configured to electrically insulate the shaving surface from the coil assembly.

3. The shaver head of claim 1, wherein the coil assembly comprises one or more coils, wherein the one or more coils are proximal to a first blade of the blade assembly in the shaving direction.

4. The shaver head of claim 1, wherein the coil assembly extends at least over 100% of a length of the blades in a direction substantially perpendicular to the shaving direction.

5. The shaver head of claim 1, wherein the coil assembly comprises one or more coils disposed at a distance less than or equal to 5 mm from the skin adaptor surface.

6. The shaver head of claim 1, wherein the electromagnetic field generated by the coil assembly comprises a frequency within a range of 5 to 500 Hz, more specifically of 10 to 60 Hz.

7. A shaving device comprising:

the shaver head of claim 1; and a handle configured to support the shaving head.

8. The shaving device of claim 7, wherein the handle further comprises a driver unit configured to provide an electrical signal for driving the coil assembly so that the coil assembly emits the electromagnetic field.

9. The shaving device of claim 7, further comprising an actuator configured to allow a user to adjust a frequency of the electromagnetic field or an intensity of the electromagnetic field.

10. The shaving device of claim 7, further comprising a skin sensor that is disposed on the skin adaptor surface between the shaving surface and the coil assembly and configured to transition the coil assembly from the inactive state to the active state when the skin adaptor surface is in contact with the shaving surface.

11. The shaving device of claim 7, further comprising a hand sensor configured to transition the coil assembly from the active state to the inactive state.

12. The shaving device of claim 7, further comprising a communication unit configured to establish a wireless connection between the shaving device and a remote device.

13. The shaving device of claim 12, wherein the communication unit is further configured to receive instructions from the remote device in order to change a frequency of the electromagnetic field or an intensity of the electromagnetic field.

14. A method of cutting hair of a shaving surface, comprising:

providing the shaving device according to claim 7;

pressing the skin adaptor surface in contact with the shaving surface;

transitioning the coil assembly from the inactive state to the active state so as to cause pili muscles in the shaving surface to contract in order to expose hair of the shaving surface.

15. The method of claim 14, further comprising moving the shaver head along the shaving surface with exposed hair in the shaving direction so that the one or more blades cut the exposed hair.

* * * * *